United States Patent [19]

Kautz

[11] Patent Number: 5,013,275

[45] Date of Patent: May 7, 1991

[54] CONTINUOUS LASER BEAM FTM MOUNTING FOR CRT

[75] Inventor: Allan D. Kautz, Naperville, Ill.

[73] Assignee: Zenith Electronics Corporation, Glenview, Ill.

[21] Appl. No.: 460,037

[22] Filed: Jan. 2, 1990

[51] Int. Cl.⁵ .......................... H01J 9/00; B23K 26/00
[52] U.S. Cl. .................................... 445/30; 219/121.63
[58] Field of Search ..................... 445/30; 219/121.63, 219/121.13

[56] References Cited

U.S. PATENT DOCUMENTS

| | | | |
|---|---|---|---|
| 4,461,945 | 7/1984 | O'Cheskey et al. | 219/121.63 |
| 4,695,761 | 9/1987 | Fendley | 445/30 X |
| 4,778,427 | 10/1988 | Strauss | 445/30 |
| 4,828,523 | 5/1989 | Fendley et al. | 219/121.63 X |
| 4,834,686 | 5/1989 | Kautz et al. | 445/30 |

OTHER PUBLICATIONS

"Pulsed Laser Beam Welding"; *Metals Handbook*, 9th Ed., vol. 6, American Soc. for Metals, Metals Park, Ohio 1983, pp. 656–658.

*Primary Examiner*—Kenneth J. Ramsey

[57] ABSTRACT

Continuous, or seam, welding of a foil tension mask (FTM) to a support structure in a color cathode ray tube (CRT) affords various advantages such as a more uniform, stronger weldment, reduced weld power, faster welding speeds, and reduced contamination of the FTM and the CRT's glass faceplate. A continuous $CO_2$ laser beam operated at approximately 185 watts output power provides sufficient energy to form a high strength FTM-support structure bond while avoiding severing the FTM as well as fouling of the small FTM spertures by the heated, molten portions of the FTM and its support structure.

6 Claims, 5 Drawing Sheets

CONTINUOUS LASER BEAM FTM MOUNTING FOR CRT

CROSS-REFERENCE TO RELATED APPLICATIONS AND PATENTS

This application is related to, but in no way dependent upon, copending applications, Ser. No. 832,493 now U.S. Pat. No. 4,730,143; Ser. No. 831,699 now U.S. Pat. No. 4,721,488; Ser. No. 831,696 now U.S. Pat. No. 4,686,416; Ser. No. 866,030 now U.S. Pat. No. 4,737,681; Ser. No. 119,765 now U.S. Pat. No. 4,776,822; Ser. No. 060,135 now U.S. Pat. No. 4,778,427; Ser. No. 138,994 filed Dec. 29, 1987; Ser. No. 140,070 filed Dec. 31, 1987; and U.S. Pat. Nos. 3,894,321; 4,069,567; 4,547,696; 4,591,344; 4,593,224; 4,595,857 and 4,656,388, all of common ownership herewith.

BACKGROUND OF THE INVENTION

1. Field of the Invention

This invention relates to color cathode ray picture tubes and is addressed specifically to an improved means and process for securing a foil tension shadow mask, sometimes referred to as a flat tension mask (FTM) or simply as a "mask", as all of these terms are taken to have the same meaning in the following paragraphs, to a shadow mask support structure that extends from the inner surface of a faceplate. Color tubes of various types having the FTM can be manufactured by the process including those used in home entertainment television receivers. The process, according to the invention, is of particular value in the manufacture of medium-resolution, high-resolution and ultra-high resolution tubes intended for color monitors.

The use of the FTM and flat faceplate provides many benefits in comparison to the conventional domed shadow mask and correlatively curved faceplate. Chief among these is a greater power-handling capability which makes possible as much as a three-fold increase in brightness. The conventional curved shadow mask, which is not under tension, tends to "dome" in picture areas of high brightness where the intensity of the electron beam bombardment is greatest. Color impurities result as the mask moves closer to the screen and as the beam-passing apertures move out of registration with their associated phosphor elements on the screen. When heated, the tension mask distorts in a manner quite differently from that of the conventional mask. If the entire mask is heated uniformly, there is no doming and no distortion until tension is completely lost; just before that point, wrinkling may occur in the corners. If only portions of the mask are heated, those portions expand and the unheated portions contract resulting in displacements within the plane of the mask; i.e., the mask remains flat.

The FTM is a part of the cathode ray tube front assembly and is located closely adjacent to the faceplate. The front assembly primarily comprises the faceplate with its screen which consists of deposits of light-emitting phosphors, an FTM and support means for the mask. As used herein, the term "FTM", or "mask", means an apertured metallic foil which may, by way of example, be about 0.001 inch thick, or less. The mask must be supported in high tension a predetermined distance from the inner surface of the cathode ray tube faceplate; this distance is known as the "Q-distance". As is well known in the art, the shadow mask acts as a color-selection electrode, or parallax barrier, which ensures that each of the three electron beams lands only on its assigned phosphor deposits.

Prior Art

U.S. Pat. No. 3,894,321 to Moore, of common ownership herewith, is directed to a method for processing a color cathode ray tube faceplate in conjunction with a thin foil tension shadow mask. A front panel is disclosed that has an inner ledge that forms a continuous path around the screen. No details as to the means for securing a foil mask to the inner lege are provided other than a statement that the mask is "sealed" to a ledge.

The use of a laser as a means for welding a foil mask on a shadow mask support attaced to the inner surface of a faceplate is described in application Ser. No. 832,493 filed Feb. 21, 1986, of common ownership herewith, and entitled "Improved Color Cathode Ray Tube Having a Face-Plate-Mounted Metal Frame with a Welded-On Tension Foil Shadow Mask". No information concerning the welding process is given other than the statement: "The welding process may be electrical resistance welding or laser welding".

In U.S. Pat. No. 4,591,344 to Palac, of common ownership herewith, a method of making a color cathode ray tube is disclosed in which a frame on which a shadow mask is stretched has indexing means cooperable with registration-affording means on a faceplate. The assembly provides for multiple registered matings of the faceplate and mask during photoscreening operations. The sealing areas of the faceplate and the frame are joined in a final assembly operation such that the frame becomes an integral constituent of the cathode ray tube.

A mask registration and supporting system for a cathode ray tube having a rounded faceplate with a skirt for attachment to a funnel is disclosed by Strauss in U.S. Pat. No. 4,547,696 of common ownership herewith. The skirt of the faceplate provides the necessary Q-distance between the mask and the screen. A frame dimensioned to enclose the screen comprises first and second spaced-apart surfaces. A tensed foil shadow mask has a peripheral portion bonded to a second surface of the frame. The frame is registered with the faceplate by ball-and-groove indexing means. The shadow mask is sandwiched between the frame and a stabilizing or stiffening member. Following final assembly, the frame is permanently fixed in place within the tube envelope between the sealing lands of the faceplate and a funnel, with the stiffening member projecting from the frame into the funnel.

In referent copending application Ser. No. 831,696, of common ownership herewith, there is disclosed an apparatus for tensing a shadow mask foil. The apparatus comprises a pedestal having registration-affording means and a tensing structure that includes a fixture comprising a pair of collars for clamping the edge of a shadow mask foil to support and maintain the foil taut. An anvil is provided for engaging a peripheral portion of the clamped foil to induce deflection of the foil and, thereby, a predetermined tension in the foil. Following a photoscreening process, the mask is secured to shadow mask supports extending from the faceplate by, for example, welding by laser.

There has been a number of disclosures of tensed foil masks and means for applying and maintaining mask tension. Typical of these is the disclosure of Law in U.S.

Pat. No. 2,625,734, which addresses the construction of a taut, planar, foraminous mask and the mounting of the mask and target (the screen on the faceplate) as a unitary assembly within the envelope. The thin metal is clamped in a frame and the mask is heated and placed under screw tension. Upon cooling, the metal contracts and the mask is thus rendered taut and held in tension by the frame. A photographic plate is used in a process for applying phosphor elements to the faceplate screening surface to provide an interchangeable mask system, rather than using a shadow mask mated with the faceplate to serve as an optical stencil during photoscreening. Law in U.S. Pat. No. 2,654,940 discloses means for stretching and captivating masks formed of mesh screens by frame means.

In a journal article there is described means for mounting a flat tension mask on a frame for use in a color cathode ray tube having a circular faceplate with a curved viewing surface. In one embodiment, the mask, which is also circular, is described as being welded to a circular frame comprised of a ⅛ inch steel section. The frame with captivated mask is mounted in spaced relationship to a phosphor-dot faceplate and the combination is assembled into the tube as a package located adjacent to the faceplate. ("Improvements in the RCA Three-Beam Shadow Mask Color Kinescope," by Grimes et al. IRE, Jan. 1954; decimal classification R583.6.)

Prior art approaches for attaching an FTM to a support structure in a color CRT using a laser have operated the laser in a pulsed mode. U.S. Pat. No. 4,834,686 to Kautz et al. discloses an FTM support rail mapping method and apparatus which teaches the use of a pulsed laser to weld the FTM. U.S. Pat. No. 4,828,523 to Fendley et al. similarly discloses a tension mask securement means and process therefore which teaches the use of a pulsed laser beam to weld the tension mask and a continuous laser beam to sever the tension mask from an in-process tension mask blank. There are several reasons for the prior art use of a pulsed laser beam. First, the pulsed mode of operation of the laser limits the length of FTM exposure upon which the laser is incident. By thus limiting FTM laser exposure, it was thought that the possibility of severing the FTM during welding was reduced. Thus, the aforementioned '523 patent cautions that "If the energy of the beam is too great, and/or the pulse width is too long, the beam will perforate and burn the foil without making a bond." (See col. 10, lines 40–42). Because of the extreme thinness of the FTM, i.e., on the order of 0.001 inch thick, or less, great care must be taken to avoid severing the FTM and precluding its high strength bonding to the support structure. However, severing of the pulsed laser mounted FTM still occurs resulting in rejection of CRT assemblies. One reason for severing of the FTM is the large output powers required when operating the laser in the pulsed mode to form a linear array of spaced weldments. These large laser output powers also cause a substantial portion of the material melted by the laser beam to be expelled from the resulting weldment crater. The material thus expelled frequently is deposited upon adjacent portions of the CRT's glass faceplate or upon the apertured portion of the FTM, preventing transmission of the electron beams through these FTM apertures. Deflection shields are frequently provided to prevent contaminating the glass faceplate or fouling of the FTM, but these shielding structures tend to be cumbersome and their use complicates and increases the cost of FTM installation and CRT assembly. The pulsed mode of laser operation requires additional laser positioning and timing control circuitry which coordinates laser on/off times with the rate of laser displacement. Finally, the laser spot may blur when parts continue to move at high rates during the welding pulse. This blurring of the pulsed laser weldment reduces penetration and creates a larger than acceptable weld spot or weld size. See Metals Handbook, Ninth Edition, Vol. 6, Welding, Brazing, and Soldering, 1983, pg. 657.

The present invention addresses the aforementioned limitations of the prior art and provides an improved approach for attaching an FTM to a support structure during assembly of a color CRT. The present invention employs a laser operated in a continuous manner as it is displaced about the periphery of an FTM for forming a continuous weldment between the FTM and its support structure without severing the FTM, while improving the bond between FTM and support structure, allowing for increased welding speeds, and permitting reduced laser beam powers for improved energy efficiency and reduced disruption of the FTM in its support structure with an associated reduction in FTM and CRT glass faceplate fouling.

OBJECTS OF THE INVENTION

It is a general object of this invention to provide a method for facilitating the manufacture of color cathode ray tubes having a tension foil shadow mask.

It is another general object of this invention to provide an improved process for securing a foil tension mask to a mask support.

It is another object of this invention to provide a feasible process for securing a relatively thin steel foil shadow mask which is under tension to a relatively thick mask support made of a special steel alloy.

A further object of the invention is to provide a method capable of maintaining a tension foil shadow mask firmly in registration under high electron beam bombardment.

A still further object of the invention is to provide a method for mounting a tension foil shadow mask support which simplifies and reduces the cost and time of color CRT manufacture.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, noted as being not to scale, in the several figures of which like reference numerals identify like elements, and in which:

DETAILED DESCRIPTION OF THE PREFERRED EMBODIMENT

Figure 1:
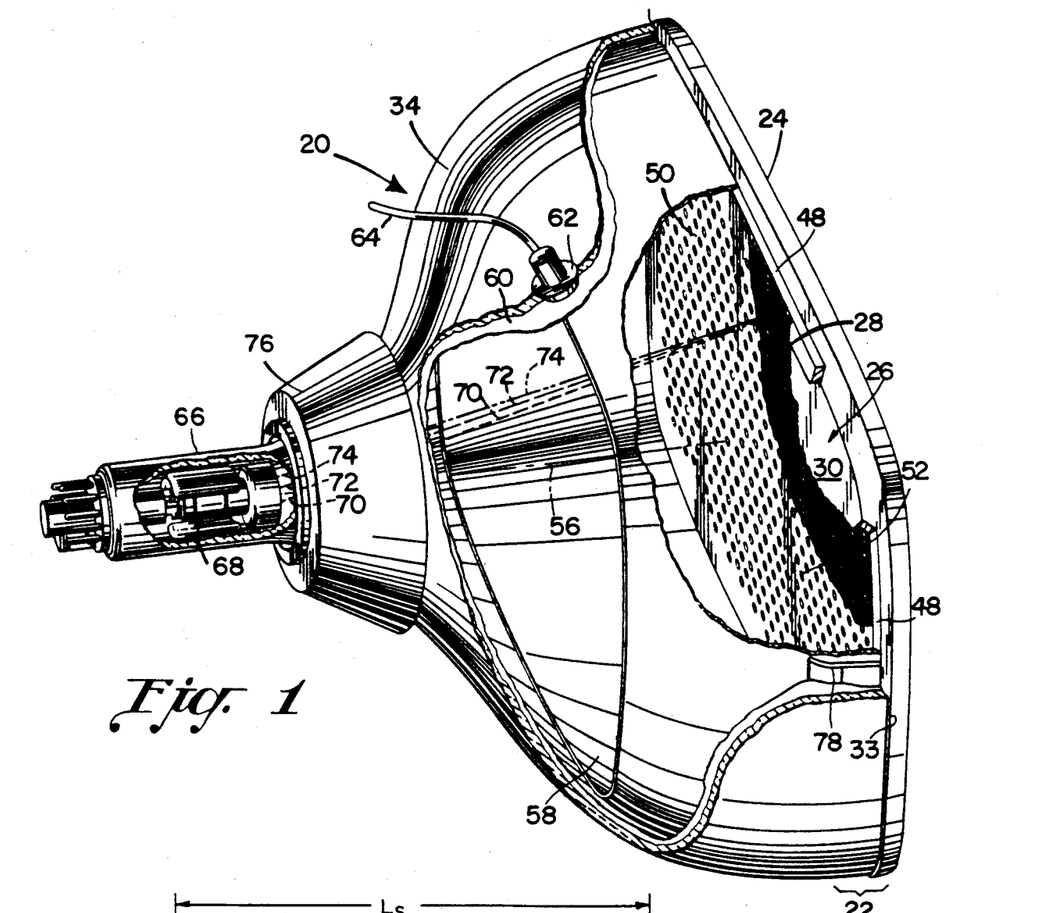
FIG. 1 is a side view in perspective of a color cathode ray tube having an FTM for which the FTM mounting procedure of the present invention is intended for use.

The color CRT 20 illustrated in FIG. 1 includes a flat faceplate 24 positioned upon and securely mounted to the forward edge portion of a funnel 32. The flat faceplate 24 and the funnel 32 are comprised of glass, with the enclosed structure thus formed evacuated by conventional means (not shown) after various electronic components are positioned therein and the structure is then sealed. Positioned within the neck portion 66 of the funnel 32 is an in-line electron gun 68 which is aligned with the anterior-posterior axis of the CRT designated by the numeral 56. The in-line electron gun 68 emits a plurality of electron beams 70, 72 and 74 which are directed through apertures 52 in a flat tension mask (FTM) 50 which is maintained under high tension and is closely spaced relative to the inner surface 26 of the faceplate 24. A magnetic deflection yoke 76 is positioned about the funnel's neck 66. Horizontal and vertical deflection currents are provided to the magnetic deflection yoke 76 for deflecting the three electron beams in a timed manner across the CRT's faceplate 24.

A high voltage electron accelerating potential is applied from a power supply (not shown) via a conductor 64 to an anode button 62 on the CRT's funnel 32. The anode button 62 extends through the CRT's funnel 32 and is in electrical contact with an internal conductive coating 60 on the inner surface of the funnel 32. A contact spring 78 is electrically coupled to the internal conductive coating 60 and is further coupled to the FTM 50 such as by means of weldments. Electrical contact is also established between the FTM 50 and a metal cap (not shown) on each of four rails which are used for mounting and positioning the FTM within the CRT 20. Disposed on the inner surface of the CRT's glass faceplate 24 is a film of reflective and electrically conductive aluminum 30. Mounted to the faceplate and positioned between the reflective and conductive aluminum 30 and the FTM 50 is a phosphor screen 28 responsive to electrons incident thereon for emitting light to form a video image.

Figure 2:
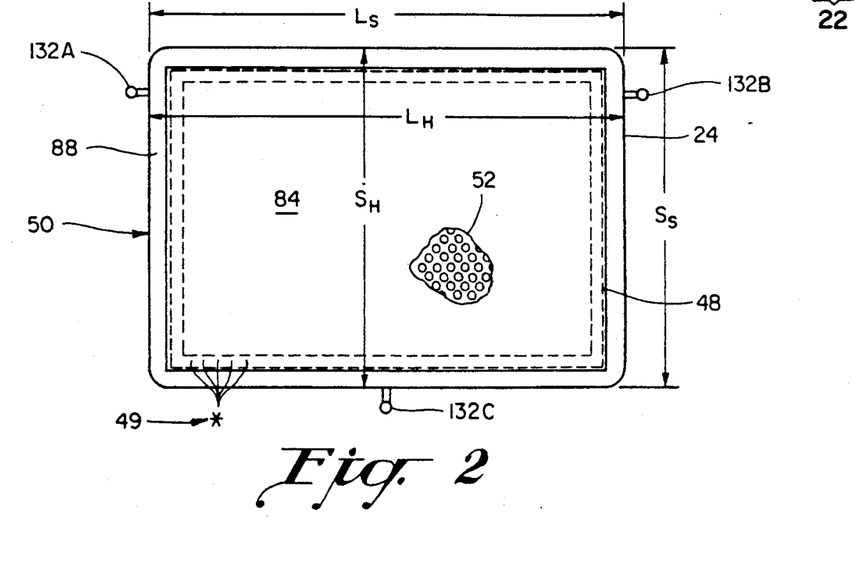
FIG. 2 is a plan view of the front assembly of the tube shown in FIG. 1 as seen from the electron gun end of the tube depicting the relationship of the FTM and faceplate of FIG. 1 and which includes an inset illustrating FTM apertures greatly enlarged.

Referring to FIG. 2, there is shown a partially cutaway plan view of the CRT 20 of FIG. 1 illustrating details of the manner in which the FTM 50 is positioned upon and mounted to the CRT's faceplate 24. The manner in which the FTM 50 is positioned upon and mounted to the CRT's faceplate 24 as shown in FIGS. 1 and 2 is provided herein to set forth the environment in which the present invention is intended for use and does not represent a limitation of the present invention. The FTM 50 includes a central field 84 having a plurality of electron-beam-passing apertures which are illustrated, in greatly enlarged size, in the inset 52 of the shadow mask. The FTM support structure 48 is generally rectangular in shape and is comprised of four elongated, linear members, each of which is coupled at one end thereof to another elongated, linear support structure element. The FTM mounting method of the present invention is intended for use with an FTM support structure 48 typically comprised of steel, such as stainless or rolled steel. The FTM 50 is securely attached to the aft surface of the FTM support structure 48 by welding the FTM around its periphery as described in detail below. Where the FTM support structure 48 is comprised of a ceramic material, the FTM 50 may be affixed to the support structure by means of a glass sealing frit cement as previously described with respect to the mounting of the FTM support structure 48 to the CRT's faceplate 24. A plurality of removeable ball assemblies 132A, 132B and 132C are disposed about the periphery of the FTM 50 and are part of a ball-and-groove indexing system for registering the faceplate 24 during manufacture. The arrangement for mounting the FTM 50 illustrated in FIGS. 1 and 2 is described and claimed in co-pending application, issued as U.S. Pat. No. 4,767,962 granted Aug. 30, 1988, and assigned to the assignee of the present application.

In one embodiment, each of the rails is connected to two adjacent rails by means of a corner coupling bracket (not shown) attached to the upper edge of each of the rails for securing the FTM 50 by weldments to its support structure 48. The corner coupling bracket may be fastened to an end of each of the rails of the FTM support structure 48 by means of a suitable cement. The foil shadow mask is maintained in a stretched manner under high tension in position adjacent to the phosphor screen 28 on the rear surface of the faceplate 24. The present invention relates to the manner in which the FTM 50 is attached to its support structure 48 and installation of this combination in the CRT which ensures that the FTM remains under high tension during CRT operation.

The electron-beam-passing apertures for an ultra-high resolution cathode ray tube may have a diameter on the order of 0.003 inch, by way of example. The FTM's central field 84 is indicated as being enclosed by a peripheral outer band 88 of solid metal. Outer band 88 serves two purposes: (1) it provides a surface for gripping the blank during the expanding of the blank in tensioning; and (2) it provides an area for affixing the mask to its underlying support structure 48, indicated by the dashed lines. As has been noted, the FTM support structure 48 serves for mounting and securing the shadow mask. In the prior art, securing of an FTM to its support structure was accomplished by a large number of weldments disposed about the FTM where it engaged its support structure. In a 14-inch tube, as many as 1,000 such welds, preferably at intervals of about 0.020 inch, are required to ensure positive securement of the mask to the underlying support structure. Where laser weldments were employed, the laser was operated at a peak output power of approximately 300 watts. After welding, the excess material of the outer band 88 is trimmed off along the outer edge of the dashed line that indicates the underlying support structure 48.

Figure 3A:
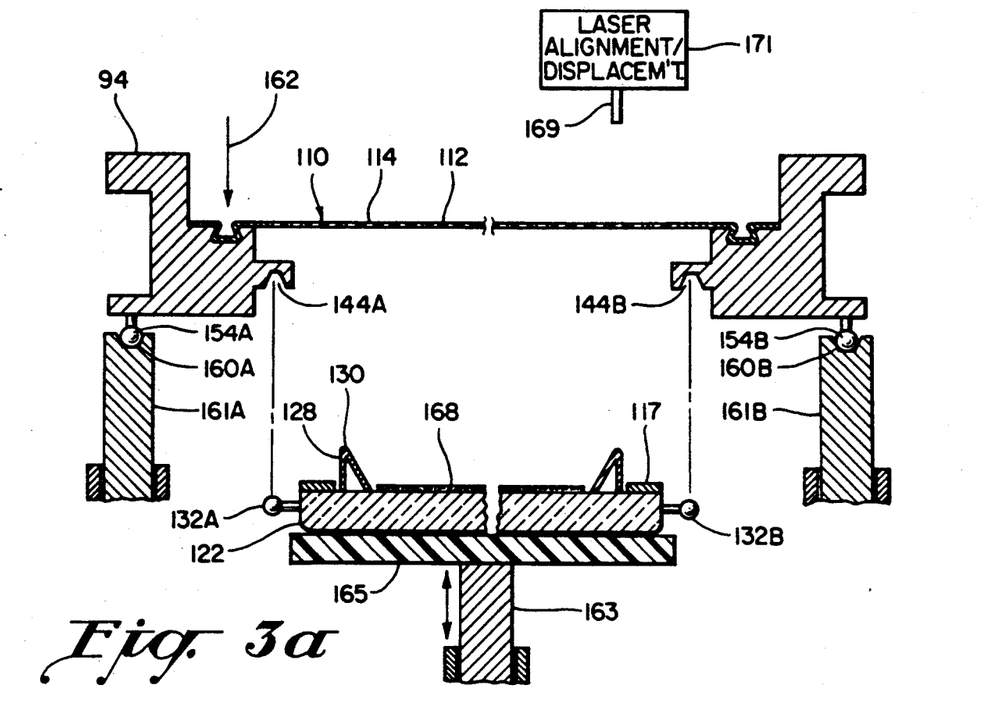
FIGS. 3a and 3b are sectional views illustrating details of an arrangement for precisely registering an FTM factory fixture frame with means for mask welding and severing the FTM.
Figure 3B:
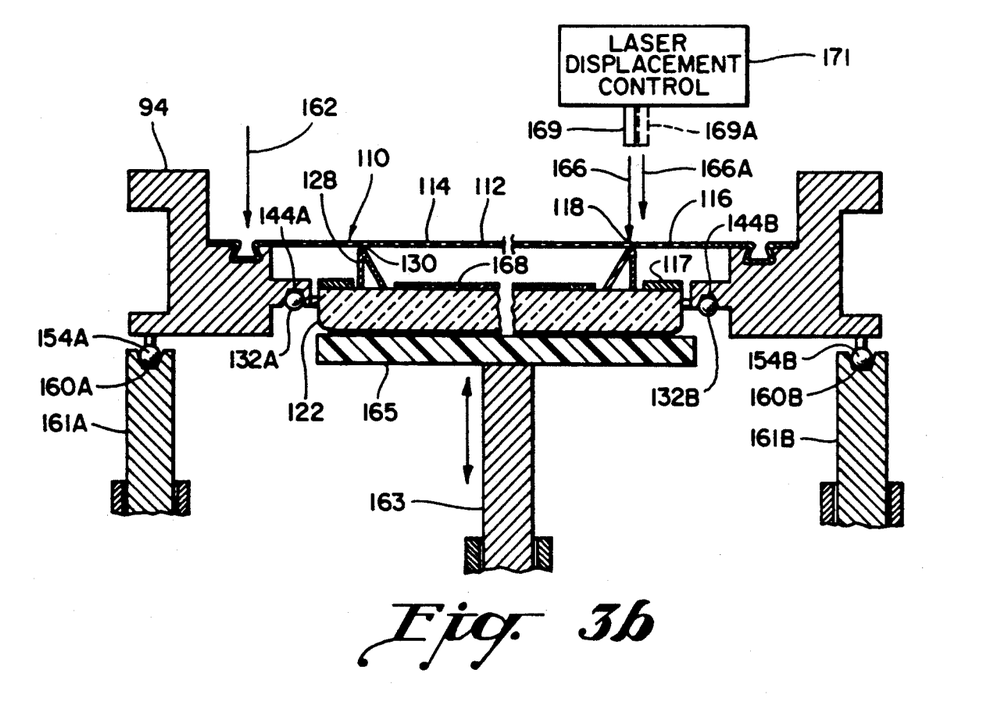

Referring to FIGS. 3a and 3b, there is shown an arrangement for mounting an in-process FTM 110 on a mask support structure 128. The FTM 110 comprises a center field 112 of apertures intended for the color selection function in a completed color CRT. Center field 112 is indicated as being enclosed by a border 114 of unperforated metal which is severed as described below from the center field 112 in a later operation along a sever line.

The FTM 110 is positioned upon and attached to a vertically moveable factory fixture frame 94. The clamping of the in-process FTM 110 is indicated schematically by arrow 162. An in-process faceplate 122 is depicted as resting on a carriage 165, indicated symbolically as comprised of plastic. A plastic softer than the glass of the faceplate is preferred as a material for carrying the faceplate to avoid scratching or other abrasion of the surface.

As indicated by the associated arrow, carriage 165 can be raised and lowered by a pneumatic piston 163, depicted in FIG. 3a as being in the lowered position, and in FIG. 3b as being in the raised position.

An FTM indexing arrangement for properly aligning the FTM 110 with the faceplate 122 includes a pair of ram heads 161A and 161B, in conjunction with a third ram head which is not shown in the figures for simplicity. FIG. 3a shows the ram heads 161A and 161B as having lifted the factory fixture frame 94.

The FTM-faceplate registration arrangement includes a plurality of indexing ball means 154A and 154B in combination with complementary indexing means in the form of grooves 160A and 160B located atop respective ram heads 161A and 161B. The ram head 161A and 161B are in turn mounted on a separate platform (not shown) and are raised in unison to engage respective indexing ball means 154A and 154B located on a lower portion of factory fixture frame 90.

As shown in FIG. 3b, the faceplate 122 has been lifted by piston 163 into exact registration with factory fixture frame 94 and with the in-process FTM 110 held in tension therein. The FTM 110 is maintained under tension within the factory fixture frame 94 by clamping as indicated previously, with the details of such clamping arrangement not shown in the figures for simplicity. The means of registration of the faceplate 122 with the factory fixture frame 94 are indicated as comprising a plurality of ball means 132A and 132B (with a third ball means not shown for simplicity) that extend from faceplate 122 with groove means 144A and 144B from the factory fixture frame 94. The mask receiving surface 130 of the FTM support structure 128 is indicated in FIG. 3b as being in intimate, uniform contact with the in-process FTM 110. It is essential for proper welding that the mask-receiving surface 130 of the FTM support 128 be absolutely clean and unoxidized. The FTM 110 could as well be in a negative interference relationship with the mask-receiving surface 130 of the FTM support structure 128 until the time of welding the mask to the mask support, as described in U.S. Pat. No. 4,778,472, of common ownership herewith.

In accordance with the principles of the present invention, the in-process FTM 110, while still clamped in tension in the factory fixture frame 94, is welded to the mask receiving surface 130 of the FTM support structure 128 by a continuous laser beam 166 emitted by a laser 169. The laser 169 is coupled to and displaced by a laser displacement controller 171 which may be conventional in design and operation. One example of a laser welding positioning and displacement arrangement which could be employed in the present invention can be found in U.S. Pat. No. 4,834,686 to Kautz et al. Upon completion of the welding of the FTM 110 to the support structure 128, the laser 169 is moved outwardly toward a peripheral edge of the FTM and the border 114 of unperforated metal of the FTM 110 is severed at the line of severance 116 by a severing laser beam as indicated by the arrow 166A in FIG. 3b and a new position of the laser at 169a.

To prevent damage to the faceplate-funnel sealing area from the laser beam during the severing process, a shield 117 may be laid over the sealing area as disclosed and claimed in co-pending application Ser. No. 336,283 filed April 11, 1989, and issued as U.S. Pat. No. 4,891,028, assigned to the assignee of the present application. Shield 117 may comprise material that reflects the laser radiation and is not damaged by the beam. A suitable material is aluminum having a thickness of at least 5 mils. Upon completion of the severing operation, the in-process FTM 110, now firmly welded to the mask receiving surface 130 of the FTM support structure 128, is free of the factory fixture frame 94, and the assembly has become a viable faceplate assembly complete with a phosphorbearing screen 168, and is ready for attachment to a funnel. Attachment of the faceplate assembly to the forward portion of the funnel may be performed by conventional means such as clamping in combination with application of a frit-based adhesive and sealing material.

The laser beam generator is, by way of example, a 600 watt Model 810 carbon dioxide laser operated in a continuouswave mode. The manufacturer of the Model 810 is Spectra Physics, Inc., of San Jose, Calif. Other lasers and related equipment having equivalent operating characteristics and parameters may be used in carrying out the present invention, as the aforementioned model is merely intended to provide one example of a laser which could be used in carrying out the present invention.

Figure 4:
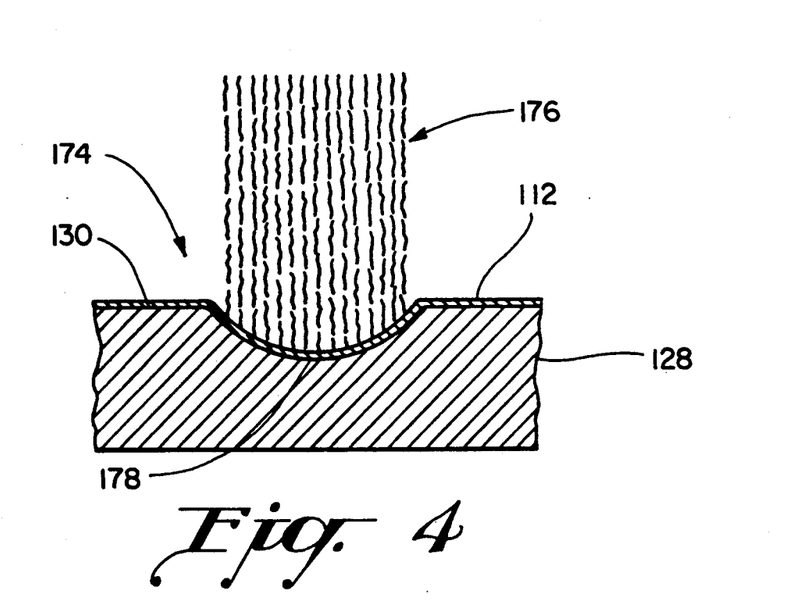
FIG. 4 is a view in elevation and section of a crater produced by a laser beam in welding an FTM to its support frame which illustrates the "signature" of the laser weldment.

The weldments of the front assembly according to the invention are distinguished by being in the form of a linear, continuous crater in the foil of the shadow mask that extends into the mask-receiving surface; the characteristics of the crater are unmistakably typical of a laser weld. An example of such a "laser signature" crater is depicted in FIG. 4 wherein crater 174 is depicted as extending into the mask-receiving surface 130 of a mask support structure 128 by laser beam 176. The area of fusion 178 of the steel foil mask 112 with the nickel alloy of the mask support 128 is indicated. This cratering is a laser signature unmistakably distinguishable over the insignia left by other types of welding such as spot, seam, projection, upset and flash, wherein the fusion takes place between the two metals to be joined with no appreciable cratering. Although an arc weld may leave a crater, there is usually an easily distinguishable deposit of filler metal from the welding rod which substantially fills the crater.

During the continuous wave mode of operation, the laser is preferably operated at an output power of 180 watts ±10% (or over a power range of approxmately 160–200 watts), which is an approximately 36% power reduction from prior art pulsed laser beam FTM installation approaches. The reduction in laser output power is made possible by the continuous seam weld formed by the present invention as opposed to the spaced weldments formed along the FTM of the prior art. In addition, the continuous welding approach of the present invention increases the welding speed from 200 inches/minute in the pulsed laser mode of operation to 300 inches/minute. The use of additional timing control circuitry for operating the laser in a pulsed mode while accounting for the displacement speed of the laser is also eliminated in the continuous laser beam approach of the present invention.

Figure 5:
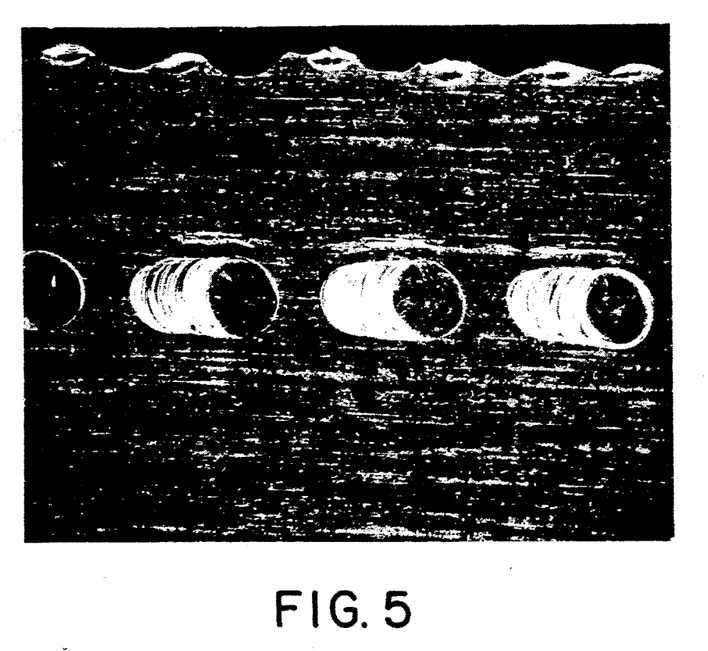
FIG. 5 is a photograph of a linear series of weldments of an FTM on a support structure using a pulsed laser in a prior art approach.
Figure 6:
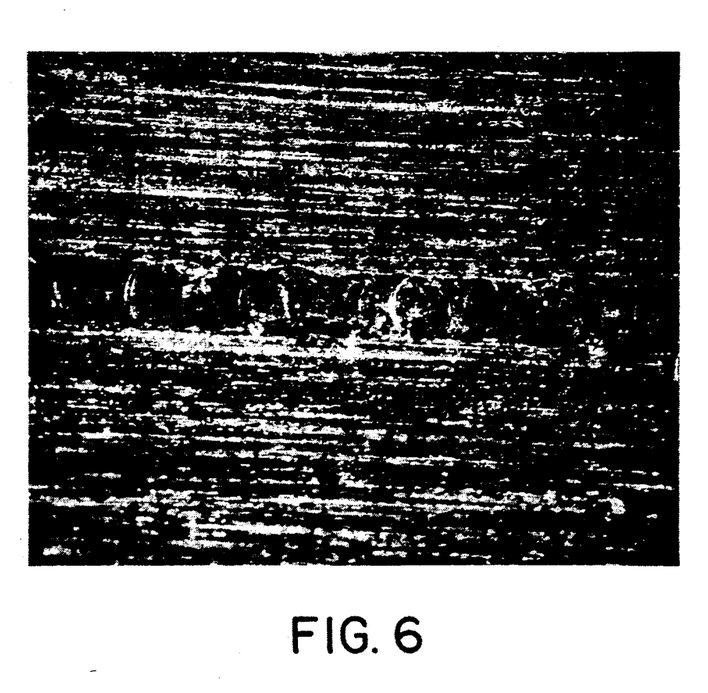
FIG. 6 is a photograph showing a linear continuous seam weld of an FTM to a support structure as provided by the present invention.

FIG. 5 is a photograph of a prior art pulsed laser beam FTM spaced weldment array. The elliptical shaped portions of the FTM surface represent the areas irradiated by the pulsed laser beam in forming spaced attachments to the FTM support structure. Referring to FIG. 6, there is shown a photograph of a continuous FTM weldment in accordance with the present invention as produced by a continuous laser beam. The continuous seam weldment of FIG. 6 indicates a more uniform and less distorted FTM surface than the pulsed laser irradiated regions of FIG. 5. The more regular appearance of the seam weldment of FIG. 6 indicates that the continuous laser beam welding approach causes less disruption and displacement of the FTM and support structure materials during the welding process. The transfer of reduced energy to the FTM and its support structure reduces the possibility of these materials being deposited on the apertured center field of the FTM to prevent transmission of the electron beams therethrough or their deposit on the CRT's glass faceplate to inhibit CRT sealing or degrade its video image.

Figure 7A:
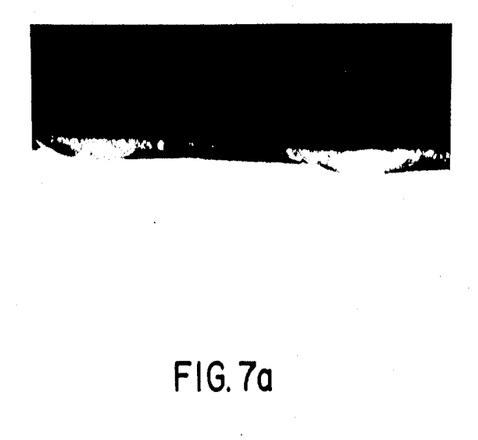
FIGS. 7a, 7b, 8a and 8b are photographs showing sectional views of weldments of an FTM and the combination of an FTM and its support structure performed by the prior pulsed laser method and the continuous laser weld method of the present invention.
Figure 7B:
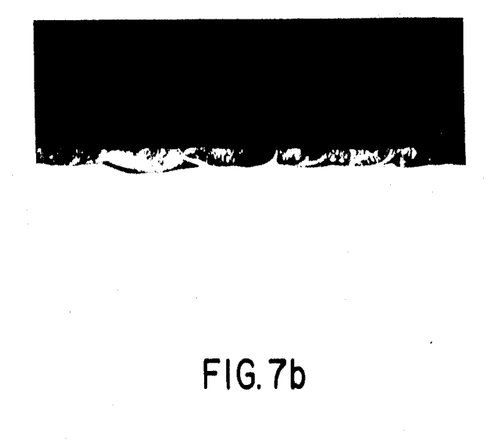
Figure 8A:
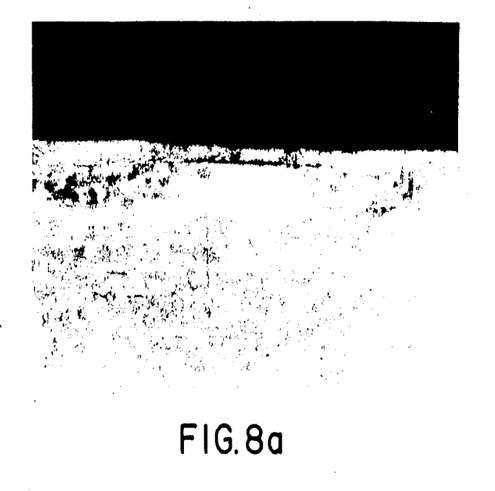
Figure 8B:
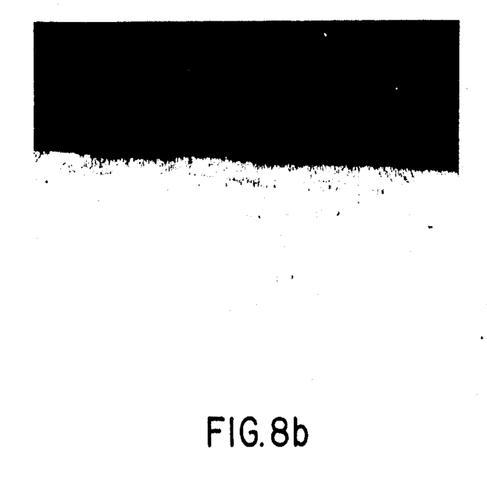

Referring to FIGS. 7a and 7b, there are respectively shown photographs of longitudinal cross-sectional views of a spot, or pulse, weld and a line, or continuous, weld area of an FTM. In both views, the laser is displaced from left to right. From FIG. 7a, it can be seen that the spot weld results in periodic weldments having a nonuniform depth. For example, the leading (or left) portion of each of the spot weldments in FIG. 7a indicates that the heat zone is deeper at the start of a laser pulse and is of reduced depth at the end of a laser pulse. This is because of the increased concentration of laser power over a small area of the FTM at the beginning of a laser pulse. The increased power applied to the FTM at the beginning of a pulse results in large scale disruption of the FTM at the pulse leading edge increasing the possibility of FTM contamination. In FIG. 7b, the continuous, or seam, weldment of the mask appears as a generally uniform weldment of constant depth. A similar situation exists when an FTM is welded to a support rail as shown in FIGS. 8a and 8b. The photo of FIG. 8a illustrates that the laser beam penetrates deeper into the FTM and its support rail at the leading edge of a pulse than at the trailing edge of the pulse. This nonuniform and high peak energy application of power to the FTM and support rail combination increases the likelihood of cutting, or severing, the FTM and displacement of the molten FTM and support rail material onto the apertured portion of the FTM or an adjacent portion of the glass faceplate which is later to be mated to the leading edge of the CRT funnel. Any contamination on the faceplate-funnel interface will result in substantial weakening of the vacuum coupling therebetween.

Similar to FIG. 7b, FIG. 8b shows that for the case of the combination of an FTM and support rail, continuous welding produces a seam weldment of generally uniform depth and at approximately the equivalent depth as the pulsed weld approach. This indicates that for continuous laser welding the laser's energy is distributed more uniformly over the entire length of the seam weldment between the FTM and its support rail for greater strength at lower laser output power.

There has thus been shown an improved approach for mounting an FTM to its support structure in a color CRT. The FTM is securely attached to its support structure by means of a continuous laser weldment which requires less laser output power to penetrate to the same depth as the pulsed mode of laser operation and reduces the possibility of contaminating adjacent portions of the FTM and CRT glass faceplate. In addition, the reduced laser output power made possible by the present invention substantially reduces the possibility of the laser beam penetrating the FTM/support rail combination in preventing the laser beam from irradiating an underlying frit layer on the glass faceplate and causing reduced bonding between the glass faceplate and FTM support rail and frit contamination within the assembled CRT bulb. The continuous mode of operation permits substantially increased welding speeds in reducing the time for CRT manufacture.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A method for attaching a thin foil tension mask (FTM) on the order of 0.001 inch thick to a metal support rail disposed on the inner surface of a flat glass faceplate during manufacture of a color cathode ray tube (CRT), the method comprising the steps of:
   aligning the FTM with the support rail;
   positioning the FTM in intimate contact with the support rail;
   irradiating the FTM with a continuous laser beam having an output power within the range of 160–200 watts; and
   displacing the laser beam over the FTM where the FTM and support rail are in contact so as to form a continuous weldment of generally uniform depth between the FTM and the support rail.

2. The method of claim 1 further comprising the step of providing a $CO_2$ laser for irradiating the FTM with the continuous laser beam.

3. The method of claim 1 further comprising the step of providing an FTM comprised of a thin apertured steel foil on the order of 0.001 inch thick.

4. The method of claim 3 comprising the step of providing a support rail comprised of stainless or rolled steel.

5. The method of claim 1 wherein the laser beam is displaced over the FTM in a linear track at a rate of approximately 200 inches/minute.

6. The method of claim 1 wherein the output power of the continuous laser beam is on the order of 180 watts.

* * * * *